United States Patent [19]
Brobeil

[11] Patent Number: 5,402,685
[45] Date of Patent: Apr. 4, 1995

[54] CIRCUIT ARRANGEMENT FOR OPERATING A PLURALITY OF MAGNETIC FLOW SENSORS WITH A SINGLE ELECTRONIC EVALUATING UNIT

[75] Inventor: Wolfgang Brobeil, Fischingen, Germany

[73] Assignee: Endress & Hauser Flowtec AG, Switzerland

[21] Appl. No.: 990,701

[22] Filed: Dec. 15, 1992

[30] Foreign Application Priority Data

Dec. 18, 1991 [EP] European Pat. Off. .......... 91810988

[51] Int. Cl.$^6$ .............................................. G01F 1/00
[52] U.S. Cl. .................................. 73/861.12; 73/861
[58] Field of Search ............ 73/861.11, 861.12, 861.15, 73/861.16, 861.17; 364/510, 509

[56] References Cited

U.S. PATENT DOCUMENTS

| | | | |
|---|---|---|---|
| 3,717,031 | 2/1973 | Biscar | 73/861.16 |
| 3,949,207 | 4/1976 | Savory et al. | 364/510 |
| 4,408,497 | 10/1983 | Suzuki | 73/861.17 |
| 4,586,144 | 4/1986 | Fukomoto | 364/510 |
| 4,593,365 | 6/1986 | Haley, Jr. et al. | 364/510 |
| 5,058,032 | 10/1991 | Farrell et al. | 364/510 |

FOREIGN PATENT DOCUMENTS 0432101 6/1991 European Pat. Off. .
58-109813 6/1983 Japan .

Primary Examiner—Richard E. Chilcot, Jr.
Assistant Examiner—R. Biegel
Attorney, Agent, or Firm—Barnes & Thornburg

[57] ABSTRACT

A circuit arrangement is provided for connect each of a plurality of magnetic flow sensors to a single electronic evaluating unit. Each of the flow sensors includes a measuring tube through which a fluid flows, a coil arrangement, and two measuring electrodes. An electronic evaluating unit includes a processing unit for the potentials of the measuring electrodes, a subsequent digital calibrating and zero-balancing arrangement for generating calibration and zero-offset data, a memory for said data, and a generator circuit for generating the coil current. Through-switching is effected by means of a switching arrangement which includes an optotriac for each flow sensor and an analog multiplexer with double or triple switching paths. The multiplexer switches through the signals from the measuring electrodes. In three further variants, a processing unit is provided in the flow sensor, and a further-processing unit in the electronic evaluating unit. In one of these variants, each of the flow sensors includes a digital calibrating and zero-balancing arrangement and a memory for the data therefrom, whose contents are switched through via a digital multiplexer. In another variant, each of the flow sensors include an analog calibrating and zero-balancing arrangement.

16 Claims, 6 Drawing Sheets

CIRCUIT ARRANGEMENT FOR OPERATING A PLURALITY OF MAGNETIC FLOW SENSORS WITH A SINGLE ELECTRONIC EVALUATING UNIT

The present invention relates to circuit arrangement for operating a plurality of magnetic flow sensors with a single electronic evaluating unit.

BACKGROUND OF THE INVENTION

EP-A-432 101 describes a circuit arrangement for supplying power to a plurality of angular-displacement sensors and for switching the values measured by the latter to a display which includes as an essential component an analog multiplexer which, if addressed in a suitable manner, transfers, on the one hand, a sinusoidal or pulse-shaped alternating voltage to the angular-displacement sensor to be selected and, on the other hand, the output signal from this sensor to an electronic evaluating unit.

Due to the specific kind of these sensors, the circuit arrangement described requires two supply lines and four measurement-signal lines per sensor, so that the analog multiplexer has one sixfold through-switching path per sensor.

Magnetic flow sensors, however, are only comparable to the prior art angular-displacement sensors inasmuch as they also have at least six leads, two of which are DC supply leads, while only two are measured-value leads, and two serve to transfer the coil current. Thus, the prior art circuit arrangement is not usable with magnetic flow sensors.

It is, therefore, an object of the invention to provide a circuit arrangement for operating a plurality of magnetic flow sensors with a single electronic evaluating unit.

SUMMARY OF THE INVENTION

According to a first variant, the invention consists in a circuit arrangement for connecting each of a plurality of magnetic flow sensors successively in time to a single electronic evaluating unit by means of a switching arrangement, each of said magnetic flow sensors comprising a nonferromagnetic measuring tube through which flows an electrically conductive fluid to be measured and which is electrically insulated from the fluid, a coil arrangement for producing a magnetic field passing through the measuring tube diametrically and perpendicularly to the longitudinal axis thereof when a coil current flows therein, and electrodes, of which two measuring electrodes which are arranged diametrically in or on the wall of the measuring tube and whose connecting line is perpendicular to the direction of the magnetic field serve to pick off the potentials induced by the magnetic field, and, if necessary, at least one additional electrode contained in the wall of the measuring tube serves as a neutral electrode of the fluid, said single electronic evaluating unit comprising a processing unit for the potentials, a digital calibrating and zero-balancing arrangement which follows said processing unit and generates digital calibration data and digital zero-offset data, an electronic memory for the digital calibration data and the digital zero-offset data of all flow sensors, and a generator circuit for generating the coil current, said switching arrangement comprising for each flow sensor:

an optically controlled current-zero turn-off thyristor (=optotriac) whose main current path is contained in one of the associated coil lines, and an analog multiplexer having as many double switching paths or triple switching paths as there are flow sensors, which double switching paths or triple switching paths switch through the signals from the two measuring electrodes or the signals from the two measuring electrodes and the neutral line, respectively, of the respective flow sensor to be connected to the electronic evaluating unit, with the digital calibration data and the digital zero-offset data having to be stored in the electronic memory during the calibration of each flow sensor, and the data associated width the currently measuring flow sensor having to be read to the processing unit.

According to a second variant, the invention further consists in a circuit arrangement for connecting each of a plurality of magnetic flow sensors successively in time to a single electronic evaluating unit by means of a switching arrangement, each of said magnetic flow sensors comprising a nonferromagnetic measuring tube through which flows an electrically conductive fluid to be measured and which is electrically insulated from the fluid, a coil arrangement for producing a magnetic field passing through the measuring tube diametrically and perpendicularly to the longitudinal axis thereof when a coil current flows therein, and electrodes, of which two measuring electrodes which are arranged diametrically in or on the wall of the measuring tube and whose connecting line is perpendicular to the direction of the magnetic field serve to pick off the potentials induced by the magnetic field, and, if necessary, at least one additional electrode contained in the wall of the measuring tube serves as a neutral electrode of the fluid, a processing unit for the potentials, and an analog calibrating and zero-balancing arrangement following said processing unit, said single evaluating unit comprising a further-processing unit for the output signal from the calibrating and zero-balancing arrangement of the currently measuring flow sensor, and a generator circuit for generating the coil current, said switching arrangement comprising a continuous power supply for the respective processing units of all flow sensors, and for each flow sensor:

an optically controlled current-zero turn-off thyristor (=optotriac) whose main current path is contained in one of the associated coil lines, and an analog multiplexer having as many double switching paths as there are flow sensors, which double switching paths switch through the output of the calibrating and zero-balancing arrangement and the neutral wire of the respective flow sensor to be connected to the electronic evaluating unit.

According to a third variant, the invention further consists in a circuit arrangement for connecting each of a plurality of magnetic flow sensors successively in time to a single electronic evaluating unit by means of a switching arrangement, each of said magnetic flow sensors comprising

- a nonferromagnetic measuring tube through which flows an electrically conductive fluid to be measured and which is electrically insulated from the fluid,
- a coil arrangement for producing a magnetic field passing through the measuring tube diametrically and perpendicularly to the longitudinal axis thereof when a coil current flows therein, and
- electrodes, of which
    - two measuring electrodes which are arranged diametrically in or on the wall of the measuring tube and whose connecting line is perpendicular to the direction of the magnetic field serve to pick off the potentials induced by the magnetic field, and, if necessary,
    - at least one additional electrode contained in the wall of the measuring tube serves as a neutral electrode of the fluid,
- a processing unit for the potentials,
- a digital calibrating and zero-balancing arrangement which follows said processing unit and generates digital calibration data and digital zero-offset data during calibration, and
- an electronic memory for the digital calibration data and the digital zero-offset data, said single electronic evaluating unit comprising
- a further-processing unit for the output signal from the processing unit, for the calibration data, and for the zero-offset data of the currently measuring flow sensor, and
- a generator circuit for generating the coil current, said switching arrangement comprising
- a continuous power supply for the respective processing unit of all flow sensors, and
- for each flow sensor:
    - an optically controlled current-zero turn-off thyristor (=optotriac) whose main current path is contained in one of the associated coil lines, and
    - an analog multiplexer having as many double switching paths as there are flow sensors,
    - which double switching paths switch through the output of the calibrating and zero-balancing arrangement and the neutral wire of the respective flow sensor to be connected to the electronic evaluating unit, and
    - a digital multiplexer for switching through the calibration data and the zero-offset data of the respective flow sensor to be connected to the electronic evaluating unit.

According to a fourth variant, the invention also consists in a circuit arrangement for connecting each of a plurality of magnetic flow sensors successively in time to a single electronic evaluating unit by means of a switching arrangement, each of said magnetic flow sensors comprising

- a nonferromagnetic measuring tube through which flows an electrically conductive fluid to be measured and which is electrically insulated from the fluid,
- a coil arrangement for producing a magnetic field passing through the measuring tube diametrically and perpendicularly to the longitudinal axis thereof when a coil current flows therein, and
- electrodes, of which
    - two measuring electrodes which are arranged diametrically in or on the wall of the measuring tube and whose connecting line is perpendicular to the direction of the magnetic field serve to pick off the potentials induced by the magnetic field, and, if necessary,
    - at least one additional electrode contained in the wall of the measuring tube serves as a neutral electrode of the fluid, and
- a processing unit for the potentials, said single electronic evaluating unit comprising
- a further-processing unit for the output signal from the processing unit,
- a digital calibrating and zero-balancing arrangement which follows said further processing unit, and
- by means of which digital calibration data and digital zero-offset data of the flow sensors are formed during a calibrating and balancing phase,
- an electronic memory for the calibration data and the zero-offset data of all flow sensors,
    - the data associated with the currently measuring flow sensor having to be read from the memory to the further-processing unit in the measurement mode, and
- a generator circuit for generating the coil current, said switching arrangement comprising
- a continuous power supply for the respective processing units of all flow sensors, and
- for each flow sensor:
    - an optically controlled current-zero turn-off thyristor (=optotriac) whose main current path is contained in one of the associated coil lines, and
    - an analog multiplexer having as many double switching paths as there are flow sensors,
    - which double switching paths switch through the output of the calibrating and zero-balancing arrangement and the neutral wire of the respective flow sensor to be connected to the electronic evaluating unit.

According to a development of each of these four variants of the invention, the analog multiplexer contains as many additional switching paths per flow sensor as there are additional electrodes per flow sensor, which are contained in the wall of the respective flow sensor and serve as fluid-monitoring electrodes, said additional switching path(s) switching through the signal from the fluid-monitoring electrode(s) of the respective flow sensor to be connected to the electronic evaluating unit.

According to another development of each of the second to fourth variants of the invention, the analog multiplexer contains one additional switching path per flow sensor which switches through a fluid-monitoring signal generated by the processing unit from a signal applied to it from an additional electrode which serves as a fluid-monitoring electrode and is contained in the wall of the respective flow sensor.

BRIEF DESCRIPTION OF THE DRAWINGS

The invention will become more apparent from the following description of embodiments of each of the four variants taken in conjunction with the accompany

DESCRIPTION OF THE PREFERRED EMBODIMENTS

Figure 1:
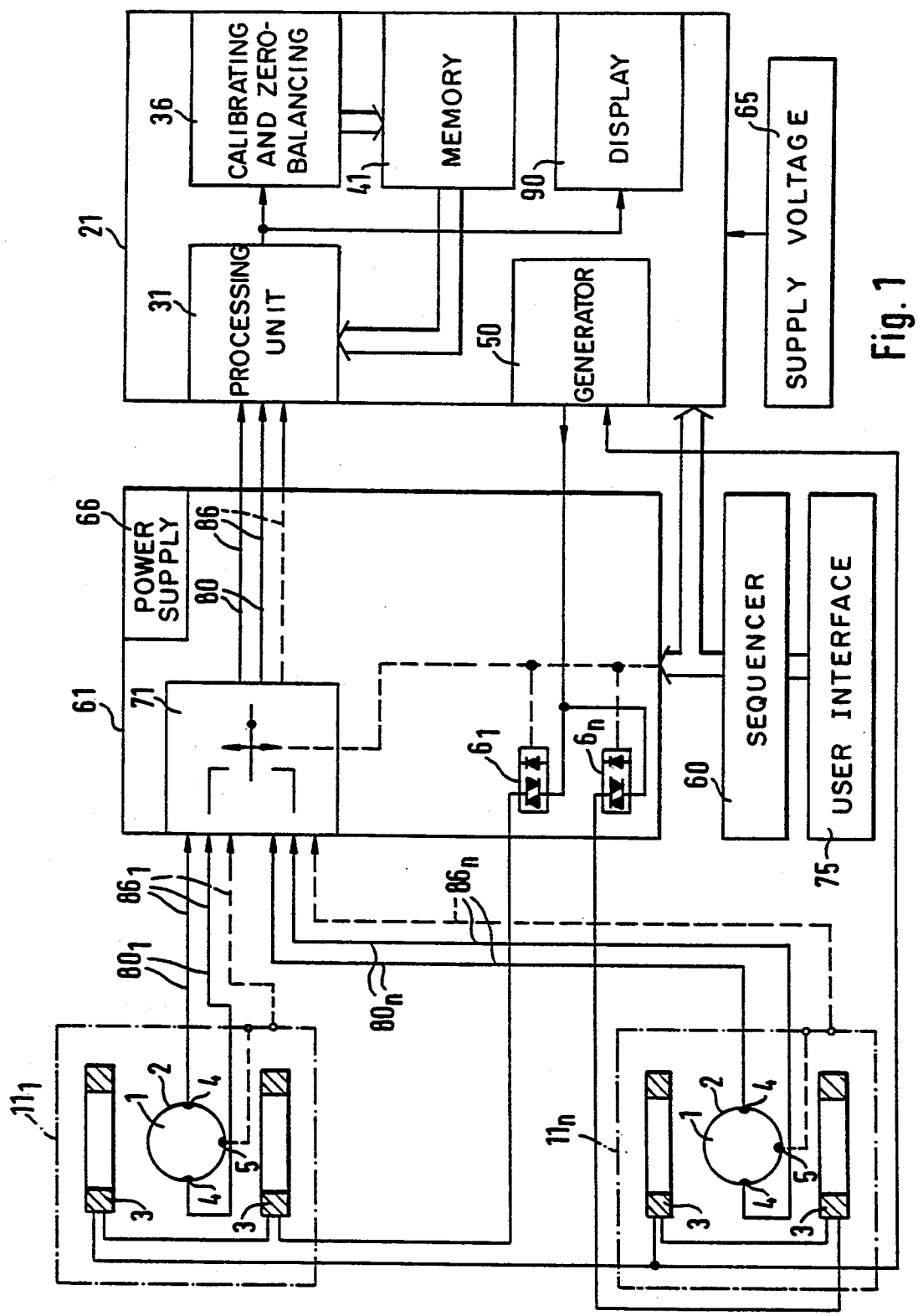
- FIG. 1 is a schematic block diagram of the first variant.

The two-digit reference characters used in the figures (with or without the subscript, indicating the number n of flow sensors provided) have been assigned according to the following system: The final digits 0, 5 designate subcircuits which are common to all variants and developments, while the final digits 1 through 4 and 6 through 9 designate subcircuits which may differ in construction from variant to variant or from development to development even though they are designated in all variants by the same technical term. The final digits 1, 6 (=1+5) designate subcircuits of the first variant, the final digits 2, 7 subcircuits of the second variant, the final digits 3, 8 subcircuits of the third variant, and the final digits 4, 9 subcircuits of the fourth variant.

Throughout FIGS. 1 to 6, parts characteristic of the mechanical design of a magnetic flow sensor are designated by the reference characters 1 through 5 and 7. Such a flow sensor, as is well known, is designed to measure the volumetric flow rate of an electrically conductive fluid 1 which flows in a nonferromagnetic measuring tube 2 that is electrically insulated from the fluid. Such measuring tubes consist, for example, of a ceramic tube or a metal tube whose inside surface is coated with a suitable plastic or rubber.

A coil arrangement 3 produces a magnetic field passing through the measuring tube 2 diametrically and perpendicularly to the longitudinal axis of the measuring tube 2 when a coil current flows therein. This may be both an alternating current and a pulsating direct current whose direction is periodically reversed to minimize polarization effects at the measuring electrodes.

Two electrodes 4 arranged diametrically in or on the wall of the measuring tube 2 serve as the measuring electrodes just mentioned, whose connecting line is perpendicular to the direction of the magnetic field, and make it possible to pick off the potentials induced by the magnetic field in accordance with Faraday's law of induction. The measuring electrodes 4 may either contact the fluid, thus discharging the potentials galvanically, or be arranged in the wall of the measuring tube so as to be isolated from the fluid, so that the potentials are picked off in a noncontacting manner and, hence, purely capacitively.

The wall of the measuring tube 2 may contain further electrodes, such as a galvanic neutral electrode 5, which serves to connect the fluid I to neutral, or a galvanic or capacitive fluid-monitoring electrode 7, which will be explained in greater detail below and, if mounted in the apex of the measuring tube 2, serves to measure, for example, whether the tube is completely filled or whether the fluid contains gas bubbles.

In the first variant, which will now be explained with the aid of FIG. 1, the flow sensors $11_1$, $11_n$ contain the parts just mentioned. Therefore, it is not necessary to supply an operating voltage to these flow sensors except that the currently measuring flow sensor needs to be supplied with the coil current. The flow sensors $11_1$, $11_n$ are connected to a single electronic evaluating unit 21, which is common to all the flow sensors, via a switching arrangement 61, by means of which the currently measuring, i.e., active, flow sensor is connected to the electronic evaluating unit 21, both for the flow of the coil current to be supplied to the coil arrangement 3 and for picking off the potentials from the measuring electrodes 4.

The active flow sensor is selected with a sequencer 60 and a user interface 75 associated the therewith. The user interface may have a keyboard, for example, by means of which the flow sensor to be activated can be selected via its number. It is also possible to provide an automatic stepping mode whereby the flow sensors $11_1$, $11_n$ are activated successively at selectable time intervals.

The switching arrangement 61 includes for each flow sensor $11_1$, $11_n$ an optically controlled, current zero turnoff thyristor $6_1$, $6_n$, a so-called optotriac, whose main current path is contained in one of the associated coil lines. To this end, these main current paths are commoned at one end to the output of a generator circuit 50 for below. The respective other end of the optotriacs $6_1$, $6_n$ generating the coil current, which is included in the electronic evaluating unit 21, which will be explained is connected to one end of the respective coil arrangement 3, and the other ends of the coil arrangements are commoned to the input of the generator circuit 50.

The optotriacs $6_1$, $6_n$ can be triggered to the conducting state by means of a signal applied from the sequencer 60 to their respective light-emitting diodes. This is illustrated in the figures by the dashed lines to the optotriacs $6_1$, $6_n$.

The switching arrangement 61 further includes an analog multiplexer 71 which has either as many, i.e., n, double switching paths $80_1$-80, $80_n$-80 or as many triple switching paths $86_1$-86, $86_n$-86 as there are flow sensors The double switching paths $80_1$-80, $80_n$-80 or the triple switching paths $86_1$-86, $86_n$-86 connect the respective two measuring electrodes 4 or the respective two measuring electrodes 4 and the respective neutral line of the flow sensors to the electronic evaluating unit 21. Via the common switching-path portion 80, the analog multiplexer 71 is connected to a processing unit 31, while the respective flow sensor is connected to the switching arrangement 61 via the switching-path portion $80_1$, $80_n$ or $86_1$, $86_n$.

The selection of the switching path is made by means of the sequencer 60. This operative connection is also illustrated in the figures by a dashed line.

The switching arrangement 61 further includes a power supply 66, with which the voltages and currents necessary to operate this arrangement are generated in the usual manner.

The electronic evaluating unit 21 includes a processing unit 31 for the switched-through potentials of the measuring electrodes 9. Suitable circuits for implementing this unit are conventional amplifier, sample/hold, and compensation circuits as are disclosed, for example, in applicant's U.S. Pat. Nos. 4,210,022, 4,422,337, 4,382,387, and 4,704,908.

The electronic evaluating unit 21 further includes a digital calibrating and zero-balancing arrangement 36, which follows the processing unit 31 and generates the digital calibration data and digital zero-offset data. To this end, it includes an analog-to-digital converter at the input end. The calibration data can be the calibration factor in digital form, for example, which is measured individually during calibration of the flow sensors and is specified, for example, on the type plate of the sensor. Similarly, the zero-offset data can be the zero-offset value in digital form, which is also determined by individual measurement and characterizes each of the flow sensors.

The electronic evaluating unit 21 further includes an electronic memory 41 for the digital calibration data and the digital zero-offset data of all the flow sensors $11_1$, $11_n$, and the aforementioned generator circuit 50 for generating the coil current. For the generator circuit, too, conventional circuits are suitable, as are described, for example, in applicant's U.S. Pat. No. 4,410,926.

The electronic evaluating unit 21 finally includes a display 90 by which at least the measured value of the volumetric flow rate and further information derived therefrom are, on the one hand, displayed and/or, on the other hand, output in a suitable electric form, e.g., as a current between 4 mA and 20 mA, as a frequency or a number of pulses of an AC signal, or as a digital signal.

The electronic evaluating unit 21 may also include one accumulating counter for each flow sensor which sums a measured value from an active flow sensor during those periods in which the remaining flow sensors are measuring, taking into account the total measurement period of these remaining flow sensors, such that it delivers a signal indicating an accumulated amount of fluid in a manner similar to a so-called totalizer, and presents it on the display 90.

For the sake of completeness, FIG. 1 also shows a supply voltage source 65 which generates the voltages and currents necessary to operate the electronic evaluating unit 21. It is also possible to dispense with the supply voltage source 65 and use the power supply 66 for the switching arrangement 61 instead. Conversely, it is also possible, of course, to do without the power supply 66 and feed the switching arrangement 61 from the supply voltage source 65.

In the first variant, the digital calibration data and the digital zero-offset data are stored in the electronic memory 41 during the calibration of each of the flow sensors $11_1$, $11_n$, which takes place with the switching arrangement 61 and the electronic evaluating unit 21 connected to the respective sensor. In operation, the data associated with the measuring, active flow sensor $11_1$, $11_n$ is read to the processing unit 31. This is illustrated in FIG. 1 by the data bus drawn between the memory 41 and the processing unit 31.

In the second variant, which will now be explained with the aid of FIG. 2, the distribution of the individual subcircuits to the flow sensors, the switching arrangement, and the electronic evaluating unit is different from that of FIG. 1. Each of the flow sensors $12_1$, $12_n$ includes a processing unit $32_1$, $32_n$ for the potentials of the measuring electrodes 4 and a subsequent analog calibrating and zero-balancing arrangement $37_1$, $37_n$.

Unlike in FIG. 1, the calibration and zero-balancing results are "held" during calibration not digitally, but in analog form, e.g., the signal transferred over the double switching paths $80_1 80$, $80_n 80$ to the switching arrangement 62 is a calibrated analog signal, namely the output signal from the calibrating and zero-balancing arrangement $37_1$, $37_n$. This output signal from the respective flow sensor $12_1$, $12_n$ can also be regarded as the respective normalized output signal from the latter. Since a major part of the measurement-signal conditioning is already performed in the respective flow sensor, only a further-processing unit 27 is necessary in the electronic evaluating unit 22. Its output is fed to the display 90. The electronic evaluating unit 22 again includes the generator circuit 50 for generating the coil current, and is powered from the supply voltage source 65.

Figure 2:
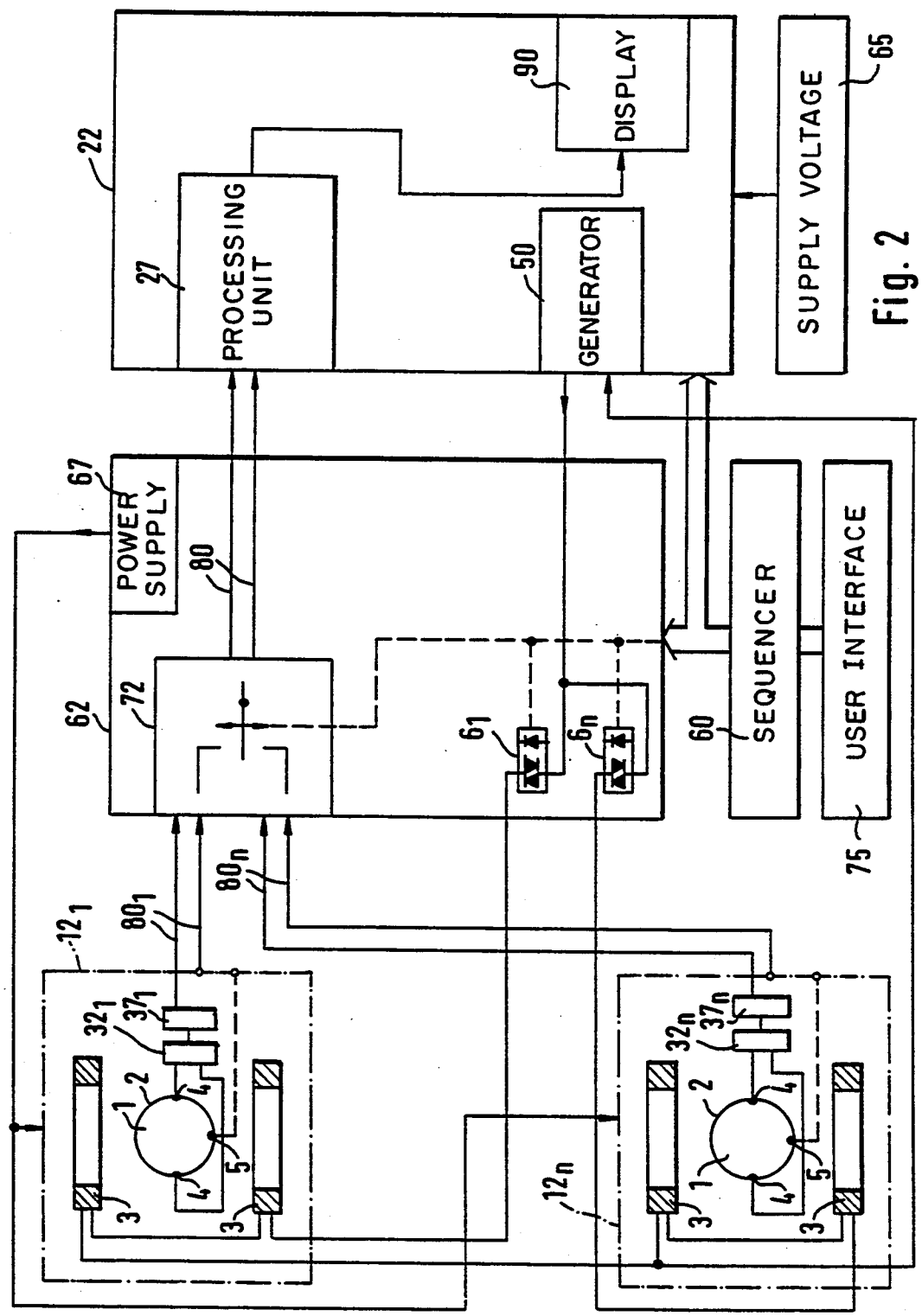
FIG. 2 is a schematic block diagram of the second variant.

The switching arrangement 62 of FIG. 2 includes a continuous power supply 67 for the respective processing units $32_1$, $32_n$ of all the flow sensors $12_1$, $12_n$. For each of the flow sensors $12_1$, $12_n$, it again includes the optotriac $6_1$, $6_n$ and an analog multiplexer 72 with the aforementioned double switching paths $80_1$-80, $80_n$-80, which switch through the output of the calibrating and zero-balancing arrangement $37_1$, $37_n$ and the neutral line of the respective flow sensor $12_1$, $12_n$ to be connected to the electronic evaluating unit 22, i.e., of the active flow sensor, in response to an input into the sequencer 60 via the user interface 75.

In the third variant, which will now be explained with the aid of FIG. 3, the distribution of the individual subcircuits to the flow sensors, the switching arrangement, and the electronic evaluating unit is different from those of FIG. 1 and FIG. 2. Each of the flow sensors $13_1$, $13_n$ includes a processing unit $33_1$, $33_n$ for the potentials of the measuring electrodes 4 and a subsequent digital calibrating and zero-balancing arrangement $38_1$, $38_n$, which generates the digital calibration data and digital zero-offset data. To do this, the arrangement $38_1$, $38_n$, like the comparable digital calibrating and zero-balancing arrangement 36 of FIG. 1, includes an analog-to-digital converter at the input end. With respect to the calibration data and zero-offset data, the above explanations apply. This data is generated during calibration and stored in an electronic memory $43_1$, $43_n$.

Figure 3:
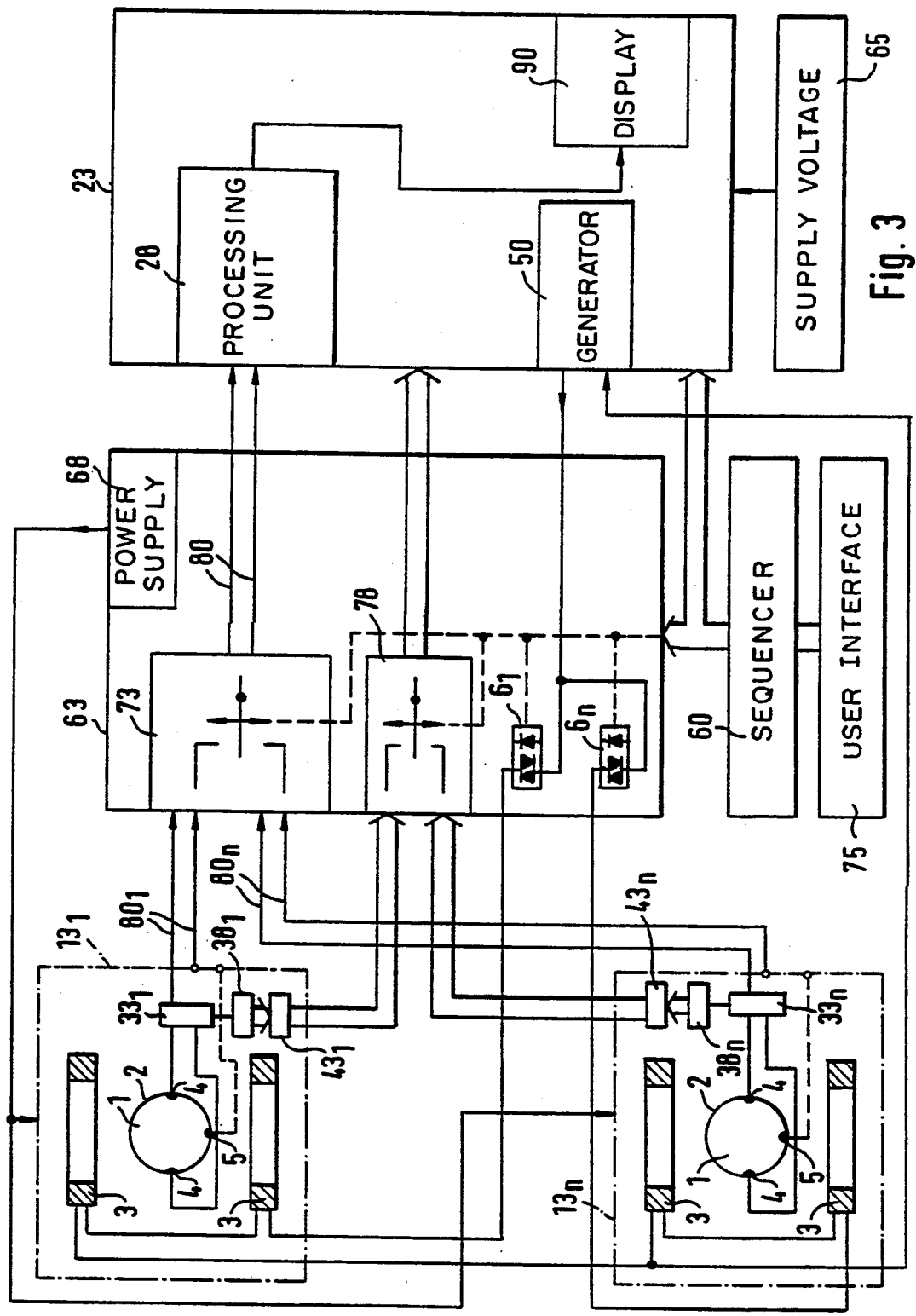
FIG. 3 is a schematic block diagram of the third variant.

The switching arrangement 63 of FIG. 3 includes a continuous power supply 68 for the respective subcircuits $33_1$, $33_n$; $38_1$, $38_n$; $43_1$, $43_n$ of all the flow sensors $13_1$, $13_n$. For each flow sensor $13_1$, $13_n$, it again includes the optotriac $6_1$, $6_n$ and an analog multiplexer 73 with the aforementioned double switching paths $80_1$-80, $80_n$-80, which switch through the output of the respective processing unit $33_1$, $33_n$ and the neutral line of the respective flow sensor $13_1$, $13_n$ to be connected to the electronic evaluating unit 23, i.e., the active flow sensor, in response to the input into the sequencer 60 via the user interface 75.

The switching arrangement 63 of FIG. 3 further includes a digital multiplexer 78 for transferring the calibration data and zero-offset data of the activated flow sensor $13_1$, $13_n$ to the electronic evaluating unit 23. The digital multiplexer 78 and the analog multiplexer 73 are controlled to switch through the selected flow sensor in accordance with the input into the sequencer 60 via the user interface 75. This is again illustrated by the dashed connecting line.

The data buses connecting the memories $43_1$, $43_n$ to the digital multiplexer 78 of the switching arrangement 63 also carry the address data selecting the memory locations, which come from the sequencer 60.

The electronic evaluating unit 23 of FIG. 3 includes a further-processing unit 28, which differs from the corresponding further-processing unit 27 of FIG. 2 essentially in that it is fed and processes not only the output from the processing unit $33_1$, $33_n$, but also the calibration data and zero-offset data of the currently measuring flow sensor $13_1$, $13_n$.

The electronic evaluating unit 23 of FIG. 3 further includes the generator circuit 50 and the display 90, whose functions were explained above. Finally, the power supply 65 is provided again.

In the fourth variant, which will now be explained with the aid of FIG. 4, the distribution of the individual subcircuits to the flow sensors, the switching arrangement, and the electronic evaluating units is different from those of FIG. 1 to FIG. 3. Each of the flow sensors $14_1$, $14_n$ includes a processing unit $34_1$, $34_n$ for the potentials of the measuring electrodes 4.

Figure 4:
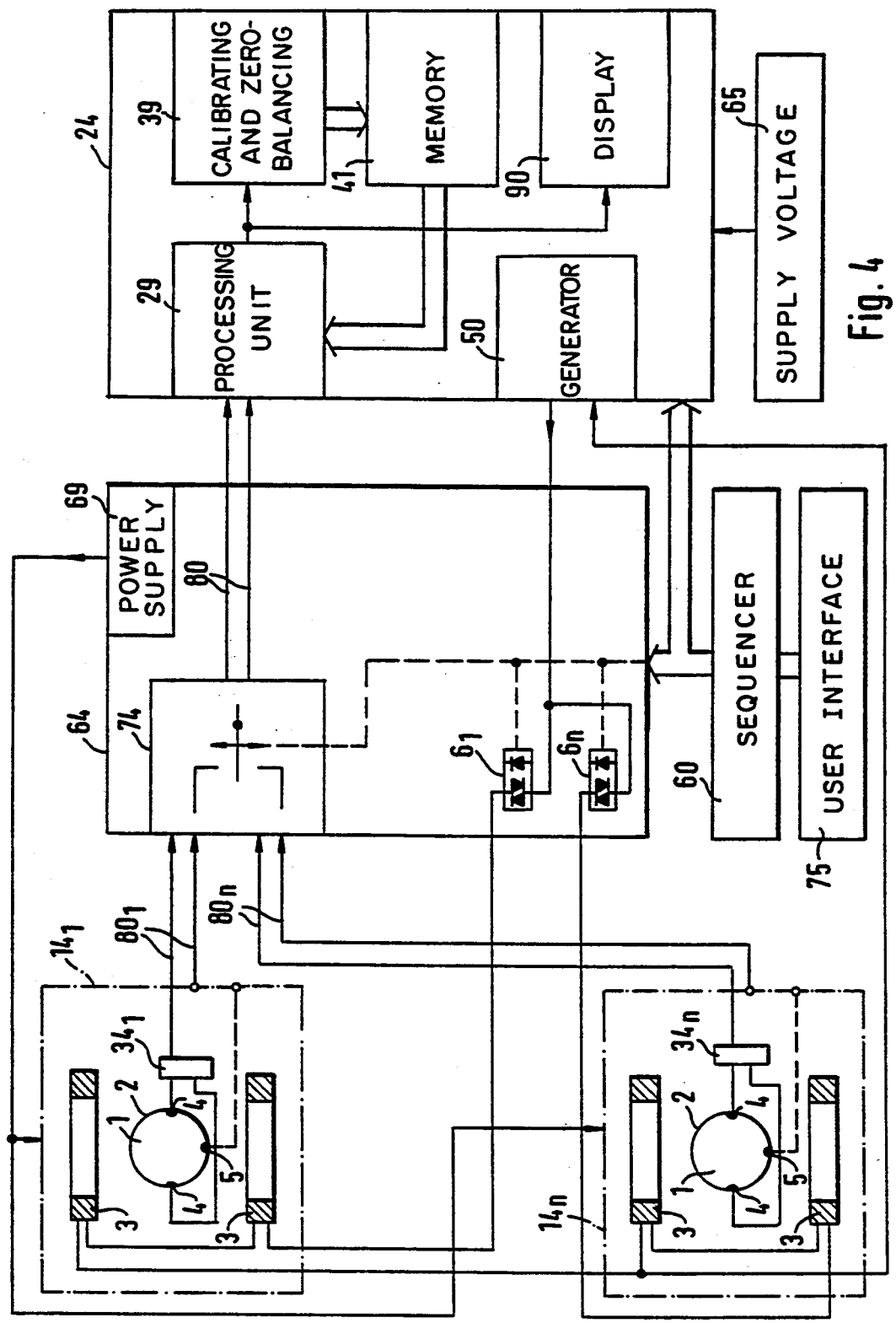
FIG. 4 is a schematic block diagram of the fourth variant.

The switching arrangement 64 of FIG. 4 includes a continuous power supply 69 for the respective subcircuits $34_1$, $34_n$ of all the flow sensors $14_1$, $14_n$. For each of the flow sensors $14_1$, $14_n$, it further includes the optotriac $6_1$, $6_n$ and an analog multiplexer 74 with the forementioned double switching paths $80_1$-80, $80_n$-80, which switch through the output of the respective processing unit $34_1$, $34_n$ and the neutral line of the respective flow sensor $14_1$, $14_n$ to be connected to the electronic evaluating unit 24, i.e., of the active flow sensor, in response to the input into the sequencer 60 via the user interface 75.

The electronic evaluating unit 24 of FIG. 4 includes a further-processing unit 29. The latter is followed by a calibrating and zero-balancing arrangement 39, by means of which digital calibration data and digital zero-offset data of the flow sensors $14_1$, $14_n$ are formed during a calibrating and balancing phase.

The electronic evaluating unit 24 of FIG. 4 further includes an electronic memory 44 for the calibration data and the zero-offset data of all the flow sensors $14_1$, $14_n$, which are written into this memory 44 during the above-mentioned calibrating and balancing phase. In the measurement mode, the data associated with the currently measuring i.e., active, flow sensor $14_1$, $14_n$ is read from the memory 44 to the further-processing unit 29. The necessary addresses, just as in the variant of FIG. 1, come from the sequencer 60, for which purpose the latter has a data-bus link to the evaluating unit 24 (or 21 in FIG. 1).

The electronic evaluating unit 24 of FIG. 4 again includes the generator circuit 50 for generating the coil current as well as the display 90, and is powered from the power supply 65.

Figure 5:
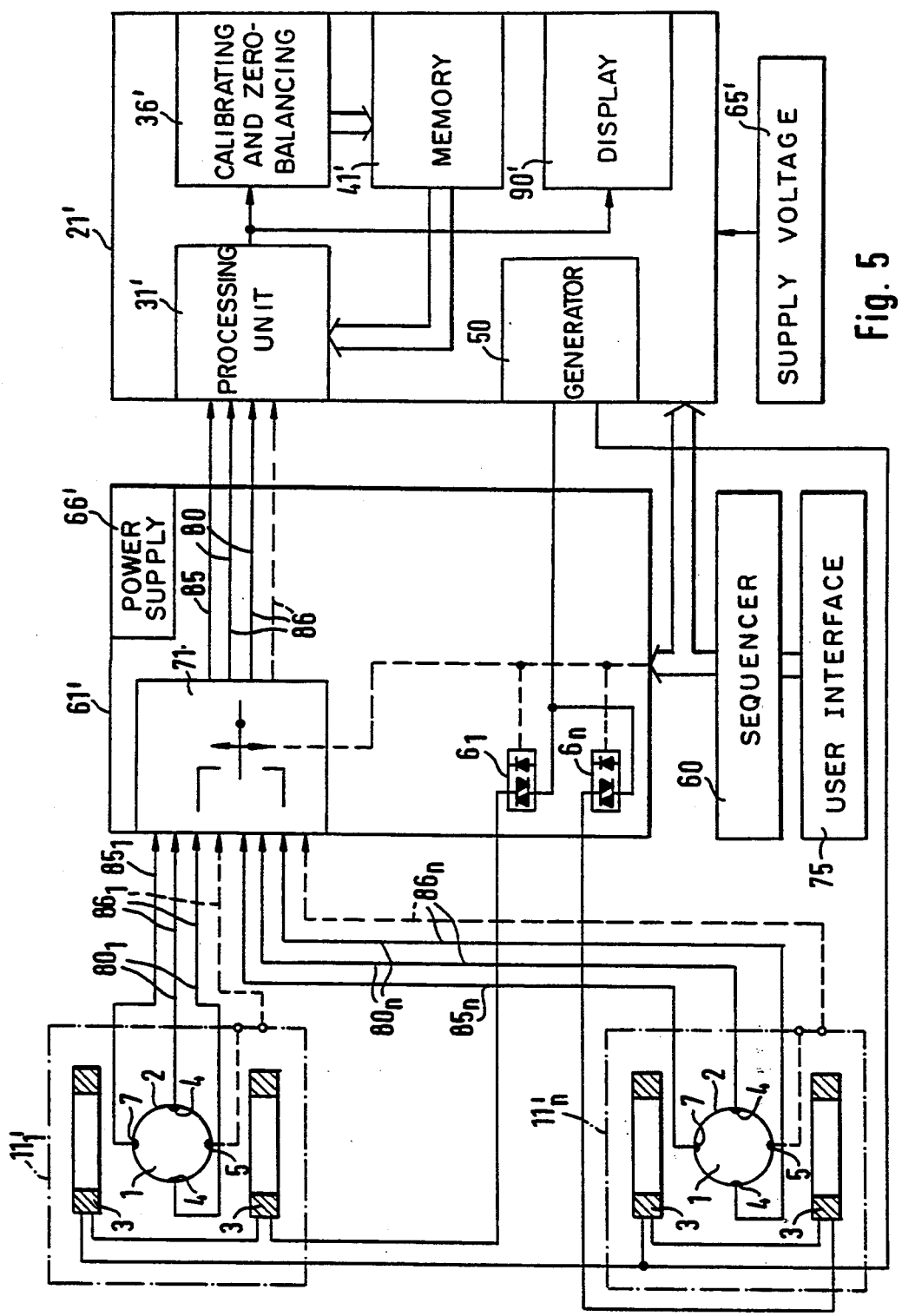
FIG. 5 is a schematic block diagram of a development which is possible with all four variants.

In the development which will now be explained with the aid of FIG. 5 and is possible with all four variants, the analog multiplexer 71' in the switching arrangement 61' has as many additional switching paths $85_1$-85, $85_n$-85 per flow sensor $11_{1'}$, $11_{n'}$, as there are additional electrodes per flow sensor $11_{1'}$, $11_{n'}$, which are contained in the wall of the respective measuring tube 2 and serve as fluid-monitoring electrodes 7. The additional switching path/paths switch through the signal from the fluid-monitoring electrode 7 of the respective flow sensor $11_{1'}$, $11_{n'}$ to be connected to the electronic evaluating unit 21'.

The processing unit 31' in the electronic evaluating unit 21' additionally includes a subcircuit for processing the signal from the fluid-monitoring electrode 7, which can be of conventional design. The other subcircuits of FIG. 5 correspond to those of FIG. 1; their reference characters, as far as they are affected by the development are provided with a prime, cf. the reference characters 36', 41', 66', and 90'.

Figure 6:
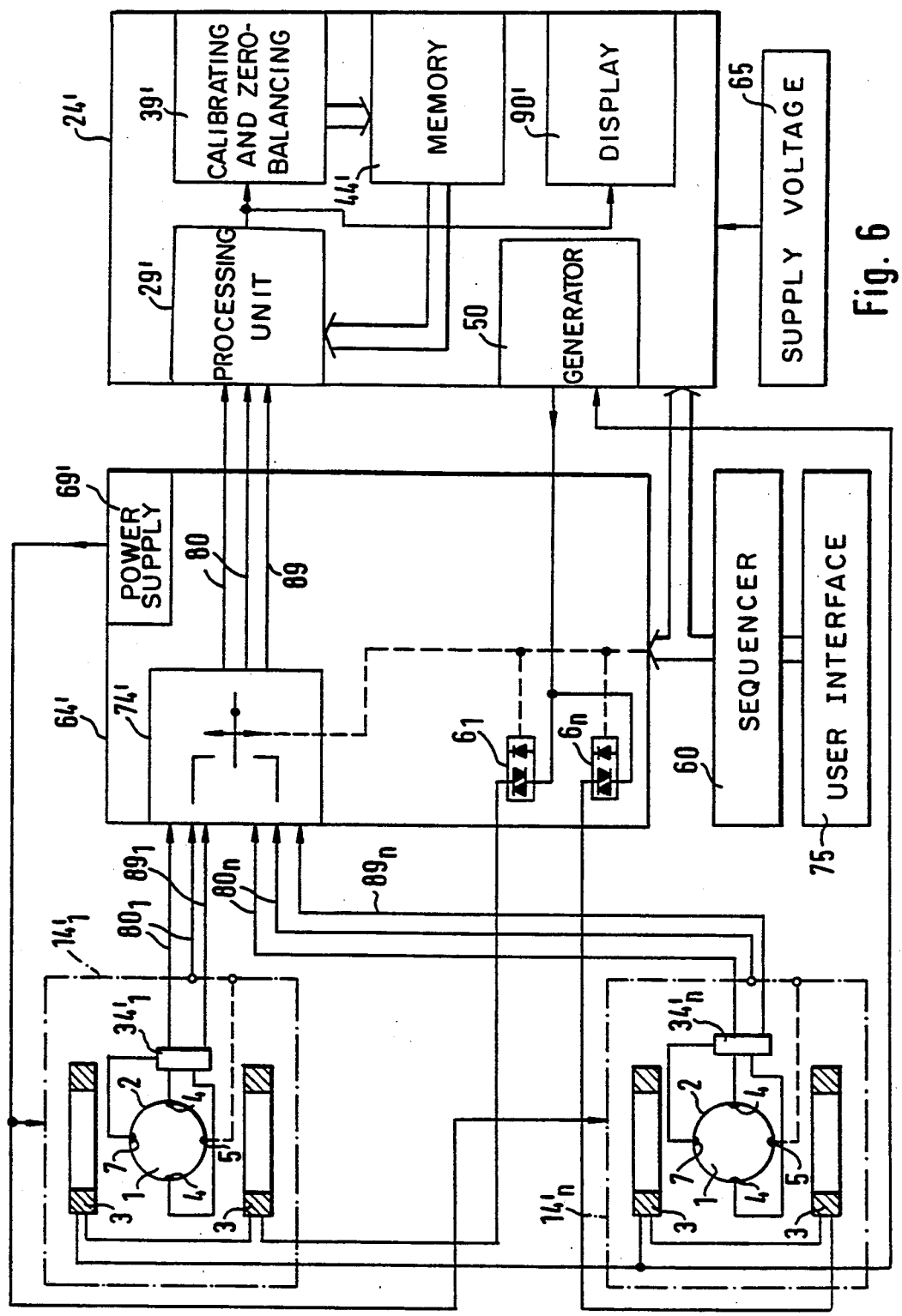
FIG. 6 is a schematic block diagram of another development which is possible with the second to fourth variants.

In the development which will now be explained with the aid of FIG. 6 and which is only possible with the second, third, and fourth variants, the analog multiplexer 74' in the switching arrangement 64' includes-one additional switching path $89_1$-89, $89_n$-89 per flow sensor $14_{1'}$, $14_{n'}$, via which a fluid-monitoring signal generated by the processing unit $34_{1'}$, $34_{n'}$, is switched through. This signal is derived by the processing unit $34_{1'}$, $34_{n'}$, from a signal applied to it from the additional electrode which serves as the fluid-monitoring electrode 7 and is contained in the wall of the respective flow sensor $14_{1'}$, $14_{n'}$.

The further-processing unit 29' in the electronic evaluating unit 24' additionally includes a corresponding subcircuit for processing the signal from the fluid-monitoring electrode 7, which can be of conventional design. The other subcircuits of FIG. 6 correspond to those of FIG. 4; their reference characters, as far as they are affected by the development, are provided with a prime, cf. the reference characters 39', 44', 69', and 90'.

I claim:

1. A circuit arrangement for connecting each of a plurality of magnetic flow sensors successively in time to a single electronic evaluating unit by means of a switching arrangement, each of said plurality of magnetic flow sensors comprising a nonferromagnetic measuring tube through which flows an electrically conductive fluid to be measured and which is electrically insulated from the fluid, a coil arrangement for producing a magnetic field passing through the measuring tube diametrically and perpendicularly to the longitudinal axis thereof when a coil current flows therein, two measuring electrodes which are arranged diametrically in or on the wall of the measuring tube and whose connecting line is perpendicular to the direction of the magnetic field serve to pick off the potentials induced by the magnetic field, said single electronic evaluating unit comprising a processing unit for the potentials, a digital calibrating and zero-balancing arrangement coupled to said processing unit and generating digital calibration data and digital zero-offset data, an electronic memory for the digital calibration data and the digital zero-offset data of all the flow sensors, and a generator circuit for generating the coil current, said switching arrangement comprising for each flow sensor:

an optically controlled current-zero turn-off thyristor whose main current path is contained in one of the associated coil lines; and an analog multiplexer having as many double switching paths as there are flow sensors, which double switching paths switch through the signals from the two measuring electrodes of the respective flow sensor to be connected to the electronic evaluating unit, with the digital calibration data and the digital zero-offset data being stored in the electronic memory during the calibration of each flow sensor, and the data associated with the currently measuring flow sensor being read to the processing unit.

2. A circuit arrangement for connecting each of a plurality of magnetic flow sensors successively in time to a single electronic evaluating unit by means of a switching arrangement each of said plurality of magnetic flow sensors comprising a nonferromagnetic measuring tube through which flows an electrically conductive fluid to be measured and which is electrically insulated from the fluid, a coil arrangement for producing a magnetic field passing through the measuring tube diametrically and perpendicularly to the longitudinal axis thereof when a coil current flows therein, two measuring electrodes which are arranged diametrically in or on the wall of the measuring tube and whose connecting line is perpendicular to the direction of the magnetic field serve to pick off the potentials induced by the magnetic field, a processing unit for the potentials, and an analog calibrating and zero-balancing arrangement coupled to said processing unit, said single evaluating unit comprising a further-processing unit for the output signal from the calibrating and zero-balancing arrangement of the currently measuring flow sensor, and a generator circuit for generating the coil current, said switching arrangement comprising a continuous power supply for the respective processing unit of all flow sensors, and for each flow sensor:

an optically controlled current-zero turn-off thyristor whose main current path is contained in one of the associated coil lines, and an analog multiplexer having as many double switching paths as there are flow sensors, which double switching paths switch through the output of the calibrating and zero-balancing arrangement and the neutral wire of the respective flow sensor to be connected to the electronic evaluating unit.

3. A circuit arrangement for connecting each of a plurality of magnetic flow sensors successively in time to a single electronic evaluating unit by means of a switching arrangement, each of said plurality of magnetic flow sensors comprising a nonferromagnetic measuring tube through which flows an electrically conductive fluid to be measured and which is electrically insulated from the fluid, a coil arrangement for producing a magnetic field passing through the measuring tube diametrically and perpendicularly to the longitudinal axis thereof when a coil current flows therein, two measuring electrodes which are arranged diametrically in or on the wall of the measuring tube and whose connecting line is perpendicular to the direction of the magnetic field serve to pick off the potentials induced by the magnetic field, a processing unit for the potentials, a digital calibrating and zero-balancing arrangement coupled to said processing unit and generating digital calibration data and digital zero-off set data during calibration, and an electronic memory for the digital calibration data and the digital zero-offset data, said single electronic evaluating unit comprising a further-processing unit for the output signal from the processing unit, for the calibration data, and for the zero-offset data of the currently measuring flow sensor, and a generator circuit for generating the coil current, said switching arrangement comprising a continuous power supply for the respective processing unit of all flow sensors, and for each flow sensor:

an optically controlled current-zero turn-off thyristor whose main current path is contained in one of the associated coil lines, and an analog multiplexer having as many double switching paths as there are flow sensors, which double switching paths switch through the output of the calibrating and zero-balancing arrangement and the neutral wire of the respective flow sensor to be connected to the electronic evaluating unit, and a digital multiplexer for switching through the calibration data and the zero-offset data of the respective flow sensor to be connected to the electronic evaluating unit.

4. A circuit arrangement for connecting each of a plurality of magnetic flow sensors successively in time to a single electronic evaluating unit by means of a switching arrangement, each of said plurality of magnetic flow sensors comprising a nonferromagnetic measuring tube through which flows an electrically conductive fluid to be measured and which is electrically insulated from the fluid, a coil arrangement for producing a magnetic field passing through the measuring tube diametrically and perpendicularly to the longitudinal axis thereof when a coil current flows therein, two measuring electrodes which are arranged diametrically in or on the wall of the measuring tube and whose connecting line is perpendicular to the direction of the magnetic field serve to pick off the potentials induced by the magnetic field, a processing unit for the potentials, said single electronic evaluating unit comprising a further-processing unit for the output signal from the processing unit, a digital calibrating and zero-balancing arrangement coupled to said further processing unit, by means of which digital calibration data and digital zero-offset data of the flow sensors are formed during a calibrating and balancing phase, and an electronic memory for the calibration data and the zero-offset data of all flow sensors, the data associated with the currently measuring flow sensor being read from the memory to the further-processing unit in the measurement mode, and a generator circuit for generating the coil current, said switching arrangement comprising a continuous power supply for the respective processing units of all flow sensors, and for each flow sensor:

an optically controlled current-zero turn-off thyristor whose main current path is contained in one of the associated coil lines, and an analog multiplexer having as many double switching paths as there are flow sensors, which double switching paths switch through the output of the calibrating and zero-balancing arrangement and the neutral wire of the respective flow sensor to be connected to the electronic evaluating unit.

5. A circuit arrangement as claimed in claim 1, comprising at least one additional electrode contained in the wall of the measuring tube which serves as a neutral electrode of the fluid, and wherein the analog multiplexer includes at least one additional switching path coupled to the at least one additional electrodes of each flow sensor, which additional electrodes are contained in the wall of the respective flow sensor and serve as fluid-monitoring electrodes, said additional switching path(s) switching through the signal from the fluid-monitoring electrode(s) of the respective flow sensor to be connected to the electronic evaluating unit.

6. A circuit arrangement as claimed in claim 2, further comprising an additional electrode contained in the wall of the measuring tube which serves as a neutral electrode of the fluid, and wherein the analog multiplexer includes an additional switching path per flow sensor which switches through a fluid-monitoring signal generated by the processing unit from a signal applied to it from the additional electrode which serves as a fluid-monitoring electrode and is contained in the wall of the respective flow sensor.

7. A circuit arrangement as claimed in claim 2, comprising at least one additional electrode contained in the wall of the measuring tube which serves as a neutral electrode of the fluid, and wherein the analog multiplexer includes at least one additional switching path coupled to the at least one additional electrodes of each flow sensor, which additional electrodes are contained in the wall of the respective flow sensor and serve as fluid-monitoring electrodes, said additional switching path(s) switching through the signal from the fluid-monitoring electrode(s) of the respective flow sensor to be connected to the electronic evaluating unit.

8. A circuit arrangement as claimed in claim 3, comprising at least one additional electrode contained in the wall of the measuring tube which serves as a neutral electrode of the fluid, and wherein the analog multiplexer includes at least one additional switching path coupled to the at least one additional electrodes of each flow sensor, which additional electrodes are contained in the wall of the respective flow sensor and serve as fluid-monitoring electrodes, said additional switching path(s) switching through the signal from the fluid-monitoring electrode(s) of the respective flow sensor to be connected to the electronic evaluating unit.

9. A circuit arrangement as claimed in claim 4, comprising at least one additional electrode contained in the wall of the measuring tube which serves as a neutral electrode of the fluid, and wherein the analog multiplexer includes at least one additional switching path coupled to the at least one additional electrodes of each flow sensor, which additional electrodes are contained in the wall of the respective flow sensor and serve as fluid-monitoring electrodes, said additional switching path(s) switching through the signal from the fluid-monitoring electrode(s) of the respective flow sensor to be connected to the electronic evaluating unit.

10. A circuit arrangement as claimed in claim 3, further comprising an additional electrode contained in the wall of the measuring tube which serves as a neutral electrode of the fluid, and wherein the analog multiplexer includes an additional switching path per flow sensor which switches through a fluid-monitoring signal generated by the processing unit from a signal applied to it from the additional electrode which serves as a fluid-monitoring electrode and is contained in the wall of the respective flow sensor.

11. A circuit arrangement as claimed in claim 4, further comprising an additional electrode contained in the wall of the measuring tube which serves as a neutral electrode of the fluid, and wherein the analog multiplexer includes an additional switching path per flow sensor which switches through a fluid-monitoring signal generated by the processing unit from a signal applied to it from the additional electrode which serves as a fluid-monitoring electrode and is contained in the wall of the respective flow sensor.

12. The circuit arrangement as claimed in claim 1, further comprising at least one additional electrode contained in the wall of the measuring tube serves as a neutral electrode of the fluid, and wherein the analog multiplexer has as many triple switching paths as there are flow sensors, which triple switching paths switch through the signals from the two measuring electrodes and the neutral electrode, respectively, of the respective flow sensor to be connected to the electronic evaluating unit.

13. A fluid flow measuring apparatus comprising:
a plurality of magnetic flow sensors, each of the plurality of magnetic flow sensors including an electrically insulated measuring tube through which an electrically conductive fluid flows, a coil arrangement for producing a magnetic field passing through the measuring tube diametrically and perpendicularly to the longitudinal axis thereof when a coil current flows therein, and two measuring electrodes configured to detect potentials induced by the magnetic field;
a single electronic evaluating unit for processing signals from a selected one of the plurality of magnetic flow sensors, the evaluating unit generating an output signal proportional to the flow of fluid through the measuring tube of the selected magnetic flow sensor; and
a switching arrangement coupled to the measuring electrodes of each of the plurality of magnetic flow sensors for separately and selectively coupling the measuring electrodes of each of the plurality of magnetic flow sensors successively in time to the single electronic evaluating unit wherein the switching arrangement includes an optically controlled current-zero turn-off thyristor having main current path contained in one of said coil arrangements.

14. The apparatus of claim 13, wherein each of the plurality of magnetic measuring sensors includes at least one additional electrode in the wall of the measuring tube, the at least one additional electrode serving as a neutral electrode of the fluid.

15. The apparatus of claim 13, wherein the evaluating unit including a processing unit for the potentials detected by the measuring electrodes, a digital calibrating and zero-balancing arrangement coupled to the processing unit for generating digital calibration data and digital zero-offset data, an electronic memory for the digital calibration data and the digital zero-offset data of all the flow sensors, and a generator circuit for generating the coil current.

16. The apparatus of claim 15, and an analog multiplexer having a plurality of double switching path, one double switching path for each of the plurality of flow sensors, which double switching paths switch through the signals from the two measuring electrodes of the respective flow sensor to be connected to the electronic evaluating unit, with the digital calibration data and the digital zero-offset data being stored in the electronic memory during the calibration of each flow sensor, and the data associated with the currently measuring flow sensor being read to the processing unit.

* * * * *